(12) United States Patent
Sprenger et al.

(10) Patent No.: US 7,364,119 B2
(45) Date of Patent: Apr. 29, 2008

(54) MULTIPURPOSE PASSENGER COMPARTMENT IN A CABIN OF A COMMERCIAL PASSENGER TRANSPORT AIRCRAFT

(75) Inventors: Wilfried Sprenger, Harsefeld (DE); Bernd Roesner, Rosengarten (DE)

(73) Assignee: Airbus Deutschland GmbH, Hamburg (DE)

( * ) Notice: Subject to any disclaimer, the term of this patent is extended or adjusted under 35 U.S.C. 154(b) by 220 days.

(21) Appl. No.: 10/929,092

(22) Filed: Aug. 26, 2004

(65) Prior Publication Data
US 2005/0103935 A1    May 19, 2005

(30) Foreign Application Priority Data
Aug. 26, 2003    (DE) ................. 103 39 077

(51) Int. Cl.
B64D 11/06    (2006.01)
(52) U.S. Cl. ................. 244/118.6
(58) Field of Classification Search ............. 244/118.5, 244/118.6; 4/664, 300, 514, 661
See application file for complete search history.

(56) References Cited
U.S. PATENT DOCUMENTS

| | | | |
|---|---|---|---|
| 4,458,864 A | | 7/1984 | Colombo et al. |
| 4,556,999 A | * | 12/1985 | Lindley ................. 4/217 |
| 4,645,145 A | | 2/1987 | Alie |
| 4,700,634 A | * | 10/1987 | Mills et al. ................. 108/43 |
| 4,884,767 A | * | 12/1989 | Shibata ................. 244/118.5 |
| 5,024,398 A | | 6/1991 | Riedinger et al. |
| 5,050,253 A | * | 9/1991 | Wasek ................. 4/645 |
| 5,111,626 A | * | 5/1992 | Fortune ................. 52/79.1 |
| 5,150,863 A | * | 9/1992 | Hozumi ................. 244/118.5 |
| 5,259,575 A | | 11/1993 | Cabrera |
| 5,383,629 A | | 1/1995 | Morgan |
| 5,577,358 A | | 11/1996 | Franke |
| 5,615,848 A | | 4/1997 | Ceriani |
| 5,662,373 A | * | 9/1997 | Hanemaayer ................. 296/164 |
| 5,687,431 A | * | 11/1997 | Garrett ................. 4/254 |
| 5,742,956 A | * | 4/1998 | Tarver ................. 4/663 |
| 6,007,025 A | * | 12/1999 | Coughren et al. ........ 244/118.6 |
| 6,056,239 A | | 5/2000 | Cantu et al. |
| 6,079,669 A | * | 6/2000 | Hanay et al. ............. 244/118.5 |
| 6,101,766 A | * | 8/2000 | Mogensen ................. 52/34 |

(Continued)

FOREIGN PATENT DOCUMENTS

DE        198 13 866        9/1999

(Continued)

Primary Examiner—Timothy D Collins
(74) Attorney, Agent, or Firm—W. F. Fasse; W. G. Fasse

(57) ABSTRACT

A compartment in a passenger transport aircraft is outfitted with functional elements that are adaptable for various uses or purposes. The compartment is bounded by walls defining dimensions approximately corresponding to a handicapped accessible toilet compartment or two standard aircraft toilet compartments. The functional elements include a seat that can be tilted up into a stowed position or tilted down into a seating position over a toilet, a table/seat that can be tilted up into a stowed position or tilted down into a table or seat position, a movable cover to selectively enclose and form a counter surface over a handwash basin, various storage spaces, etc. The functional elements can be selectively arranged as needed to configure the compartment as a handicapped accessible toilet compartment, a childcare or medical care room, an office work compartment, a detention cell, a smokers' compartment, etc.

22 Claims, 6 Drawing Sheets

U.S. PATENT DOCUMENTS

| | | | |
|---|---|---|---|
| 6,152,400 | A | 11/2000 | Sankrithi et al. |
| 6,182,926 | B1 | 2/2001 | Moore |
| 6,273,366 | B1 | 8/2001 | Sprenger et al. |
| 6,394,492 | B1* | 5/2002 | Corbett .................. 280/751 |
| 6,454,209 | B1 | 9/2002 | Bock et al. |
| 6,604,709 | B1* | 8/2003 | Wentland et al. ........ 244/118.5 |
| 6,615,421 | B2* | 9/2003 | Itakura ..................... 4/664 |
| 6,877,694 | B2 | 4/2005 | Gonzalez |
| 6,935,648 | B2* | 8/2005 | Beck ..................... 280/250.1 |
| 6,938,284 | B2* | 9/2005 | Kitade et al. ............... 4/664 |
| 6,976,732 | B2* | 12/2005 | Thomas et al. ............... 297/1 |
| 7,055,442 | B2* | 6/2006 | Podd et al. ............... 108/25 |
| 2003/0155466 | A1* | 8/2003 | Wentland et al. ........ 244/118.5 |
| 2004/0163170 | A1* | 8/2004 | Cooper et al. ............... 4/664 |
| 2004/0227034 | A1* | 11/2004 | Wentland et al. ............ 244/119 |
| 2005/0001097 | A1 | 1/2005 | Saint-Jalmes |
| 2005/0230539 | A1* | 10/2005 | Quan ..................... 244/118.1 |

FOREIGN PATENT DOCUMENTS

| | | |
|---|---|---|
| EP | 0606920 B1 | 7/1994 |
| EP | 1 209 078 | 5/2002 |
| FR | 917 909 | 1/1947 |
| GB | 2 354 990 | 4/2001 |
| GB | 2 354 991 | 4/2001 |
| JP | 4-050072 | 2/1992 |
| JP | 2 633 977 | 4/1997 |
| JP | 2001-180596 | 7/2001 |
| WO | WO 03/026962 | 4/2003 |
| WO | WO 2004/009442 | 1/2004 |

* cited by examiner

MULTIPURPOSE PASSENGER COMPARTMENT IN A CABIN OF A COMMERCIAL PASSENGER TRANSPORT AIRCRAFT

PRIORITY CLAIM

This application is based on and claims the priority under 35 U.S.C. §119 of German Patent Application 103 39 077.4, filed on Aug. 26, 2003, the entire disclosure of which is incorporated herein by reference.

FIELD OF THE INVENTION

The invention relates to a passenger compartment in the cabin of a commercial passenger transport aircraft, which is equipped or outfitted with various functional elements adapted for various purposes, and which has a spatial size approximately corresponding to a handicapped accessible toilet compartment enclosed within a front wall, a rear wall and side walls.

BACKGROUND INFORMATION

In view of the present-day increasing size of passenger transport aircraft, and also the longer flight durations (e.g. over fifteen hours) being flown by such aircraft, new and additional demands are being made by passengers and by situations that arise during flight, which must be handled or mastered by the flight attendants or other aircraft crew personnel, and which require the airlines or aircraft manufacturers to provide measures accommodating these demands and situations. For example, the number or proportion of older passengers is constantly rising, and therewith the risk that serious health problems will occur during a flight is increasing. As another example, there is an increasing demand for suitable accommodations for mothers, fathers or other caregivers to provide the necessary childcare for a child or especially an infant or baby traveling in their care. Moreover, safety situations, such as the need to isolate and restrain belligerent, refractory or obstinate passengers, are arising evermore often. Triggers for such behaviors of passengers may, for example, be misuse of alcohol or drugs, an aggressive behavior or psychological problems, or physical/medical attacks, cramps, or the like. Passengers are further calling for special accommodations in view of the fact that a long flight duration may sensibly be used for work activities, e.g. carrying out office work. For this purpose, however, the typical narrow passenger seat is only suitable to a rather limited extent.

U.S. Pat. No. 5,024,398 (Riedinger et al.) discloses the arrangement of one or more office modules within the passenger cabin of an aircraft, to provide for the user of such a module a somewhat undisturbed work environment. For this purpose, the modules are suitably equipped or outfitted for carrying out office work, for example with a desk, a chair, a telephone, a computer connection, and the like. Each module is bounded by sidewalls that do not extend up to the ceiling of the aircraft cabin to leave an open top of the module, and has an access opening that is preferably selectably closeable or coverable by means of a curtain or the like. Such a module, while being equipped and outfitted for office work, is not suitable for multiple purposes, and is not adapted to be easily converted for various uses.

Further special-use compartments or rooms, for example such as parent-child compartments, information centers, and telephone booths, as they are sometimes provided in passenger trains and passenger ships, have not been provided in passenger aircraft. The reason for this is especially the strictly limited space available in the aircraft cabin, as well as the strict weight limitations in aircraft. For these reasons, common or publicly accessible compartments in passenger aircraft have nearly exclusively been designed and equipped as single-purpose toilet, lavatory or restroom compartments.

SUMMARY OF THE INVENTION

In view of the above, it is an object of the invention to provide a multipurpose passenger compartment in the cabin of a passenger transport aircraft, that does not occupy significantly more space than a toilet compartment, yet is easily and quickly adaptable in its layout and equipping so that it can be used for many different purposes, depending on the particular needs in a given situation. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a passenger transport aircraft having a passenger cabin therein, with a compartment bounded by a front wall, a rear wall, and side walls in the cabin. The invention particularly provides an improvement in the compartment, which is a convertible multipurpose compartment equipped or outfitted with various different functional elements adapted for different uses or purposes. Furthermore, the improved compartment has the size or particularly the floor space dimensions in a range from the dimensions of a typical normal aircraft toilet compartment up to the dimensions of a handicapped accessible restroom or toilet compartment or 2.5 times the dimensions of the normal aircraft toilet compartment. The functional elements include various different components for multipurpose or multi-use outfitting or equipping of the compartment, especially including at least one seat element, a variable table/seat element that can be selectively configured as a table and as a seat, and storage spaces, that are adaptable to the particular selected utilization or application configuration.

The improved compartment according to the invention can be basically designed as a handicapped accessible toilet or restroom compartment, with additional functional elements that can be selectively arranged, deployed or configured to convert the compartment for any selected one of multiple purposes or uses. For example, the compartment can be converted into an arrest or detention cell for physically restraining and detaining a passenger, or as a childcare or infant care room for a mother to care for her child, or as a medical care room suitable to care for an accident victim or emergency patient, or as a work office or conference room, or as a special purpose room for special treatments of passengers.

Such a convertible or adaptable multipurpose compartment has not previously been provided in passenger aircraft. It is expected that the inventive multipurpose compartment will satisfy the need for various specialized passenger compartments, especially during long-haul flights, for achieving a certain private sphere in particular situations, for example the breast-feeding or other feeding of babies, the changing of diapers of babies, the changing of medical bandages or other medical care of emergency or accident patients, or the separate confined and restrained transport of riotous, violent or aggressive passengers. Thus, the inventive adaptable multipurpose compartment will also achieve a considerable improvement of the overall comfort as well as the safety of normal passengers, including both passengers who use the compartment as well as passengers who do not.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
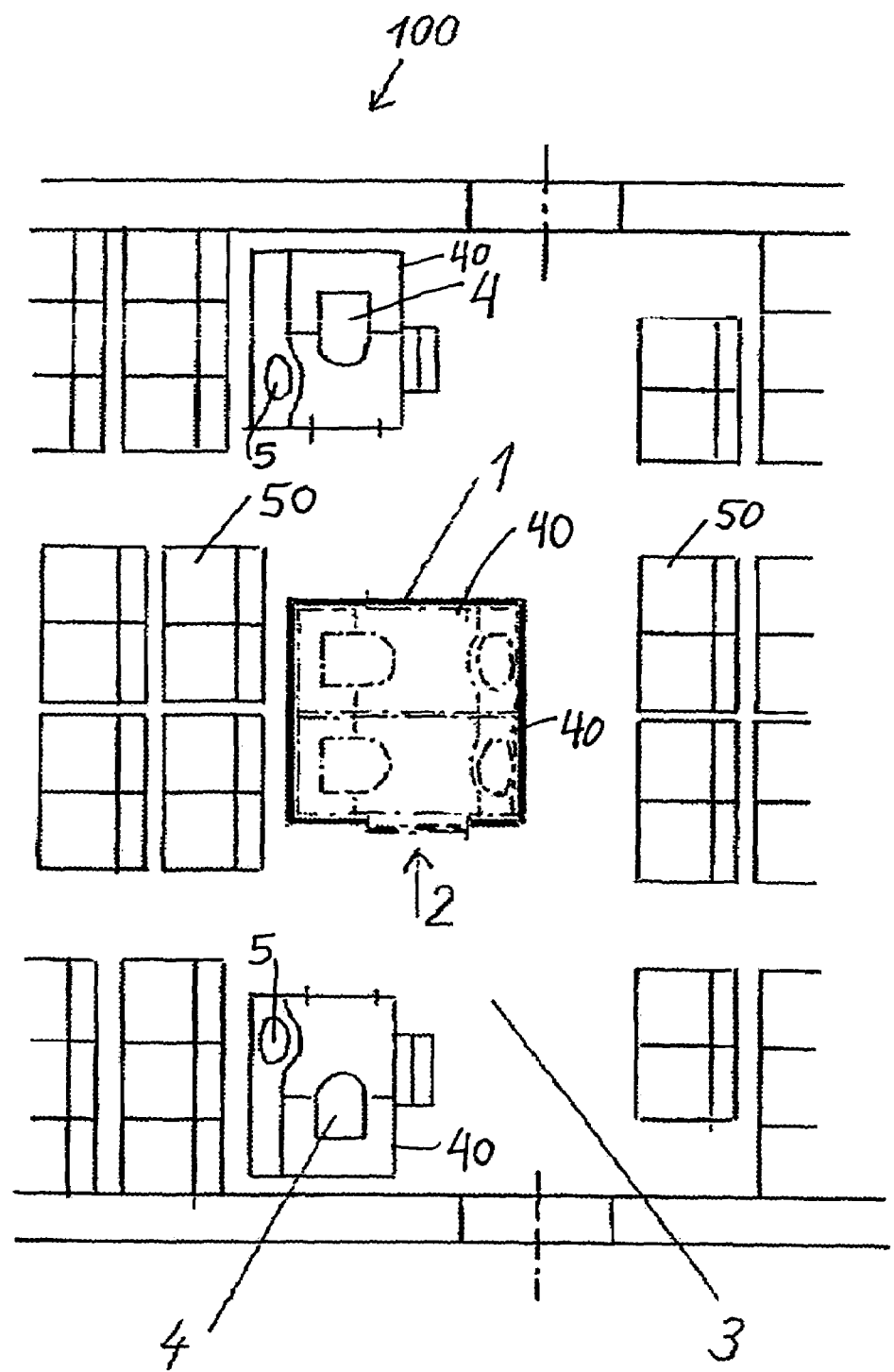
FIG. 1 is a schematic plan view of a cabin floor area of a passenger cabin of a transport aircraft, in which the inventive multipurpose compartment is arranged.

The schematic plan view of FIG. 1, which is approximately to scale, shows a cabin floor area 3 in a passenger cabin of a passenger aircraft 100 equipped with standardized passenger seats 50. Also arranged in this cabin floor area 3 are two typical toilet or lavatory compartments 40 that are located along the outside fuselage walls and are each outfitted with a toilet 4 and a handwash basin 5. Furthermore, a multipurpose compartment 1 according to the invention is arranged along the axial centerline of the aircraft 100 in this passenger floor area 3. An access opening or entry/exit 2 of the multipurpose compartment 1 is indicated by an arrow.

It can be seen that this multipurpose compartment 1 occupies the space, and particularly the floor area, of two normal or conventional toilet compartments that are each outfitted with a toilet and a handwash basin, and that are shown with dash-dotted lines for the sake of comparison. In other words, the inventive multipurpose compartment 1 effectively replaces or is provided instead of such two conventional toilet compartments 40. Since the multipurpose compartment 1 occupies the floor space otherwise available for the two conventional toilet compartments 40, these toilet compartments 40 must be positioned at other locations in the aircraft 100. In this regard, in order not to reduce the number of passenger seats 50, the displaced toilet compartments 40 can, for example, be arranged in a below deck space of a multi-deck high capacity aircraft.

In the example of FIG. 1, the multipurpose compartment 1 has a substantially square or quadratic floor plan with a side length of about 1470 mm (or 58 inches). In general, it should be understood that a rectangular floor plan, for example with side lengths in a range from 1200 to 1600 mm is also possible, without an unacceptable limitation of the cabin floor area 3 while also achieving sufficient space within the multipurpose compartment 1. Floor plan configurations other than squares and rectangles are also possible, for example three-sided, four-sided or five-sided figures with equal or unequal angles or equal or unequal side lengths, in order to best fit the available space in the cabin floor area 3. It is preferred that the multipurpose compartment 1 should be designed with dimensions sufficiently large to provide a comfortable space for the continuous occupancy of the compartment 1 by at least two persons. Generally, plan dimensions of the compartment 1 range from the typical dimensions of a normal aircraft toilet compartment, up to the dimensions of a handicapped accessible toilet compartment or up to about 2.5 times the dimensions of the normal aircraft toilet compartment.

In a particular embodiment of the invention, a handicapped accessible toilet compartment, which is quite generously dimensioned relative to the tight or cramped space available in the aircraft cabin, may be adapted to establish thereof a multipurpose compartment 1 by equipping or outfitting the compartment with appropriate variable or adaptable functional elements. A combination or multipurpose utilization of a handicapped accessible toilet compartment as a multipurpose compartment 1 is advantageous if the aircraft passenger cabin 100 needs to be equipped with such a handicapped accessible toilet, yet the frequency of use thereof is very low, or even zero for a given flight. In such a situation, the compartment and its allocated cabin floor space will also be useable for other purposes.

Nonetheless, in other embodiments of the invention, the multipurpose compartment 1 can be arranged in the passenger cabin entirely independently of an aircraft toilet and thus independently of any water supply and wastewater connections or installations. In other words, a multipurpose compartment 1 that is not to fulfill toilet or lavatory purposes does not need to be located for connection to the water supply and wastewater systems of the aircraft, but rather can be located freely anywhere as desired in the cabin.

Figure 2A:
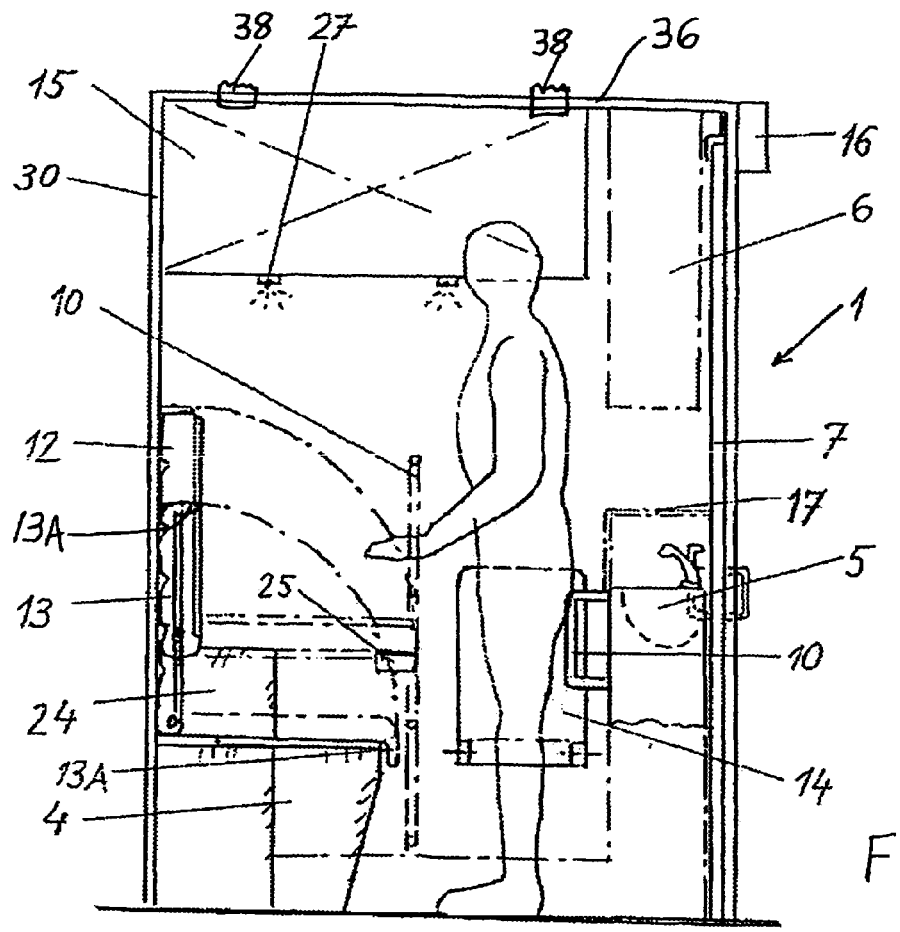
FIG. 2A is a schematic elevation view of the inventive multipurpose compartment.
Figure 2B:
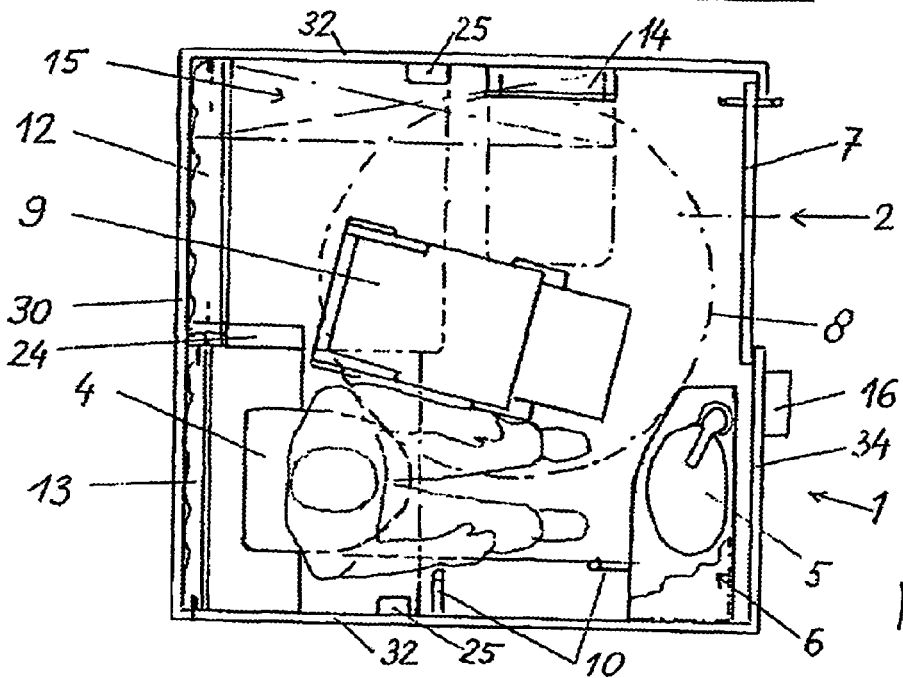
FIG. 2B is a schematic plan view of the multipurpose compartment according to FIG. 2A.

FIGS. 2A and 2B show the elevation view and plan view of a multipurpose compartment 1 configured as a handicapped accessible toilet compartment with sanitary installations, such as a toilet 4, a handwash basin 5, and a sanitary goods cabinet 6 arranged above the basin 5. The compartment 1 is formed or bounded by a rear wall 30, two side walls 32, and a front wall 34, which extend from floor to ceiling of the aircraft cabin or are enclosed by a compartment ceiling 36, so as to enclose a compartment space within the compartment 1. An entry/exit access entryway or doorway 2 is provided in the front wall 34. In order to achieve a substantial enclosure of the compartment space, and facilitate access by a wheelchair user, the entry/exit doorway 2 is selectively closeable with a sliding door 7, which can be moved (i.e. opened and closed) manually or automatically by pressing a button provided for this purpose. In the event the compartment 1 is to be lockable and only selectively opened or closed and locked by the aircraft cabin personnel, the activation of the door opening mechanism can be by means of a door key insertable in a door lock, or a touch key pad for inputting a numeric code, or the like.

Due to the relatively large floor plan dimensions of this multipurpose compartment 1, there is a sufficient shunting or maneuvering area 8 (shown in dash-dotted lines) for allowing the reversing or turning of a wheelchair 9. Sturdy and relatively large-dimensioned handrails or grips 10 meet the requirements for handicapped access and assist a handicapped person in moving within the compartment 1, for example from the wheelchair 9 to the toilet 4.

For enabling further uses of the multipurpose compartment 1, various different functional elements are arranged in the compartment 1, for example including a foldable or tiltable table/seat element 12 and a foldable or tiltable seat element 13 that are secured above the toilet 4 on the rear wall 30 and/or on a side wall 32 of the compartment 1. Moreover, another folding seat 14 and a hanging cabinet 15 are arranged on one of the side walls 32. For using the compartment 1 as a toilet compartment, the elements 12, 13 and 14 are tilted upwardly into respective stowed positions along the walls, in which the elements do not significantly encroach on the available space within the compartment 1. In these tilted-upward stowed positions, the elements 12, 13 and 14 have a flat, smooth, hard, preferably non-porous, easily cleanable surface 20 facing inwardly into the compartment 1. Furthermore, a display or indicator panel 16 is arranged on the outside of the front wall 34 of the compartment 1 adjacent to the entryway 2, and indicates the respective selected use or purpose of the compartment 1 as well as the occupancy status thereof, for example in the present case: "handicapped toilet/occupied/vacant".

Figure 3:
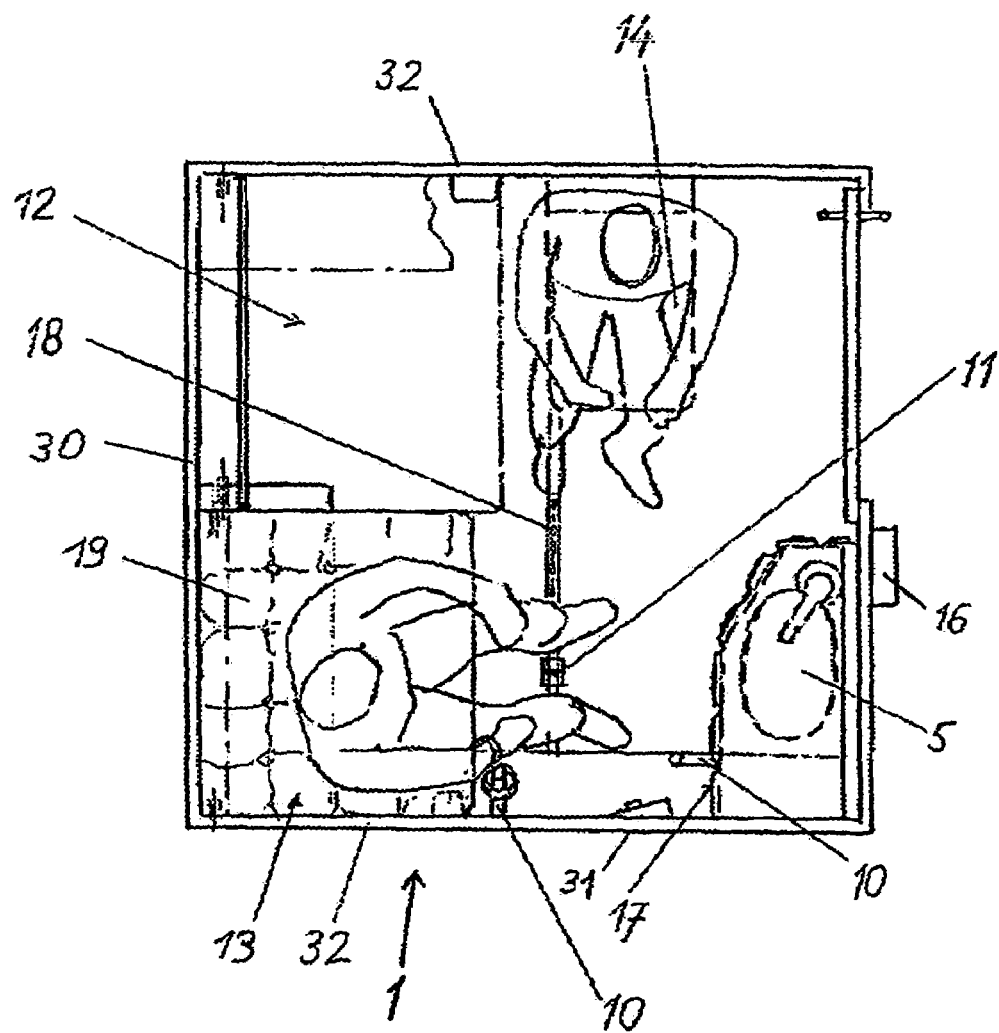
FIG. 3 is a schematic plan view of the multipurpose compartment adapted or set-up as a passenger arrest or detention compartment.

FIG. 3 shows a multipurpose compartment 1, which may be the same compartment 1 as shown in FIGS. 2A and 2B, but which has been converted, reconfigured, or adapted into the form of an arrest or detention cell for the confinement, detention, and custodial supervision of a person who would otherwise endanger the flight safety of the aircraft or the safety of other passengers. For this purpose, the seat element 13 is tilted down from its stowed vertical position (as in FIGS. 2A and 2B) to a horizontal position for use as a seat above the toilet 4. In this deployed or useable horizontal position, the seat element 13 is latched or secured by any suitable latch device(s). The front edge 13A of the seat element 13 (see FIG. 2A) has an L-shaped protruding rim or lip, that extends downwardly from the main body of the seat element in the deployed position of the seat element 13, so as to substantially visually hide or cover the toilet 4 below the seat element 13. Thus, the toilet 4 is essentially no longer in view or apparent as a toilet. Similarly, a moveable cover 17, e.g. embodied as a bellows or as a rollable slatted cover (e.g. similar to that of a roll-top desk), can be deployed to visually cover the handwash basin 5, and may additionally serve as a horizontal counter surface or table if needed.

The person to be detained in the compartment 1 is to be seated on the seat element 13 and can be secured by handcuffs and/or ankle shackles or the like to the available strong handrails or grips 10 as well as additional securing eyelets 11. For this purpose, the securing eyelets 11 may be secured in a structurally strong manner to the seat mounting rails 18 typically provided along the cabin floor area 3 of the aircraft 100 and particularly running along the floor through the compartment 1.

The compartment 1 further has the tiltable or foldable seat 14 tilted down and deployed into a seating-use position, so that an additional person can be seated thereon as illustrated in FIG. 3. For example, a second person to be detained in the compartment 1, or a security guard or air marshal can be seated on the foldable seat 14. It is further apparent in FIG. 3, that at least three persons would have space to be seated in the multipurpose compartment 1. Namely, the table element 12 will then serve the purpose of another seat element, for an additional person to be seated thereon. As needed, additional securing eyelets 11 and/or strong handrails or grips 10 can be provided and secured on the seat mounting rails 18 and/or on the walls 30, 32 and/or 34.

With the above described arrangement or set-up of the multipurpose compartment 1, it is possible to effectively and continuously isolate, detain, and restrain aggressive passengers or the like. For enabling the reconfiguration of the multipurpose compartment 1 in this manner, merely relatively few strong handrails, grips, and/or securing eyelets are necessary for converting the original handicapped toilet compartment into a relatively neutral-appearing room. However, for use as an arrest or detention cell, further measures are preferably also provided. For example, a monitoring arrangement 31, such as a monitoring camera and microphone, structurally strong and noise-insulating walls 30, 32 and 34, as well as appropriate indications outside of the compartment 1 on the indicator panel 16 are to be provided. Moreover, a smoke and temperature sensor is provided in the compartment 1, as it is typically provided in aircraft toilet or lavatory compartments. It should be understood that the monitoring arrangement 31 shall only be activatable in the special case of detaining a person in the compartment. For example, a contact sensor can sense when the seat 13 is tilted downward into the seating-use position, and only then will enable the activation of the monitoring arrangement 31. Furthermore, the monitoring arrangement 31 is manually activated by aircraft cabin personnel when the compartment 1 is converted or readied for detaining a person therein.

Figure 4:
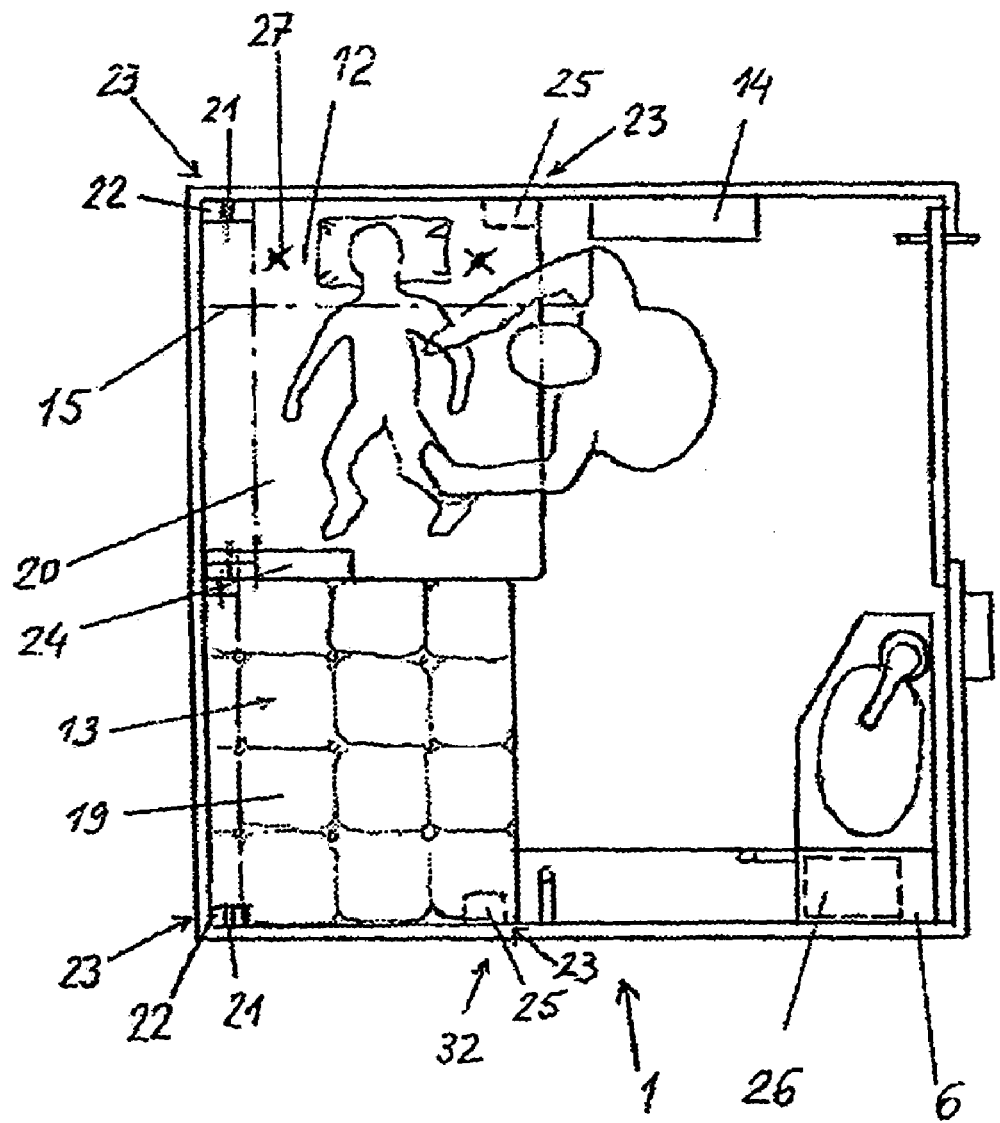
FIG. 4 is a schematic plan view of the multipurpose compartment adapted or set-up as a mother/childcare compartment or a medical care compartment.

FIG. 4 shows the inventive multipurpose compartment 1 that has been once again or further converted or adapted into a different configuration, now particularly as a childcare room for a mother or other caregiver to diaper, feed, or otherwise care for a child, and particularly an infant, or as a medical treatment or care room for treating an ill or injured passenger. This configuration of the multipurpose compartment 1 is achieved, most simply, by tilting down and latching the table element 12 into a horizontal position in which it can be used as a baby diapering table. For this purpose, the table element 12 has one soft padded or cushioned surface 19 and one smooth flat solid hard surface 20 on opposite sides thereof. The respective desired top surface of the table element 12 for use as a diaper changing table can be selected simply by rotating or turning over the table element 12.

Figures 6A, 6B:
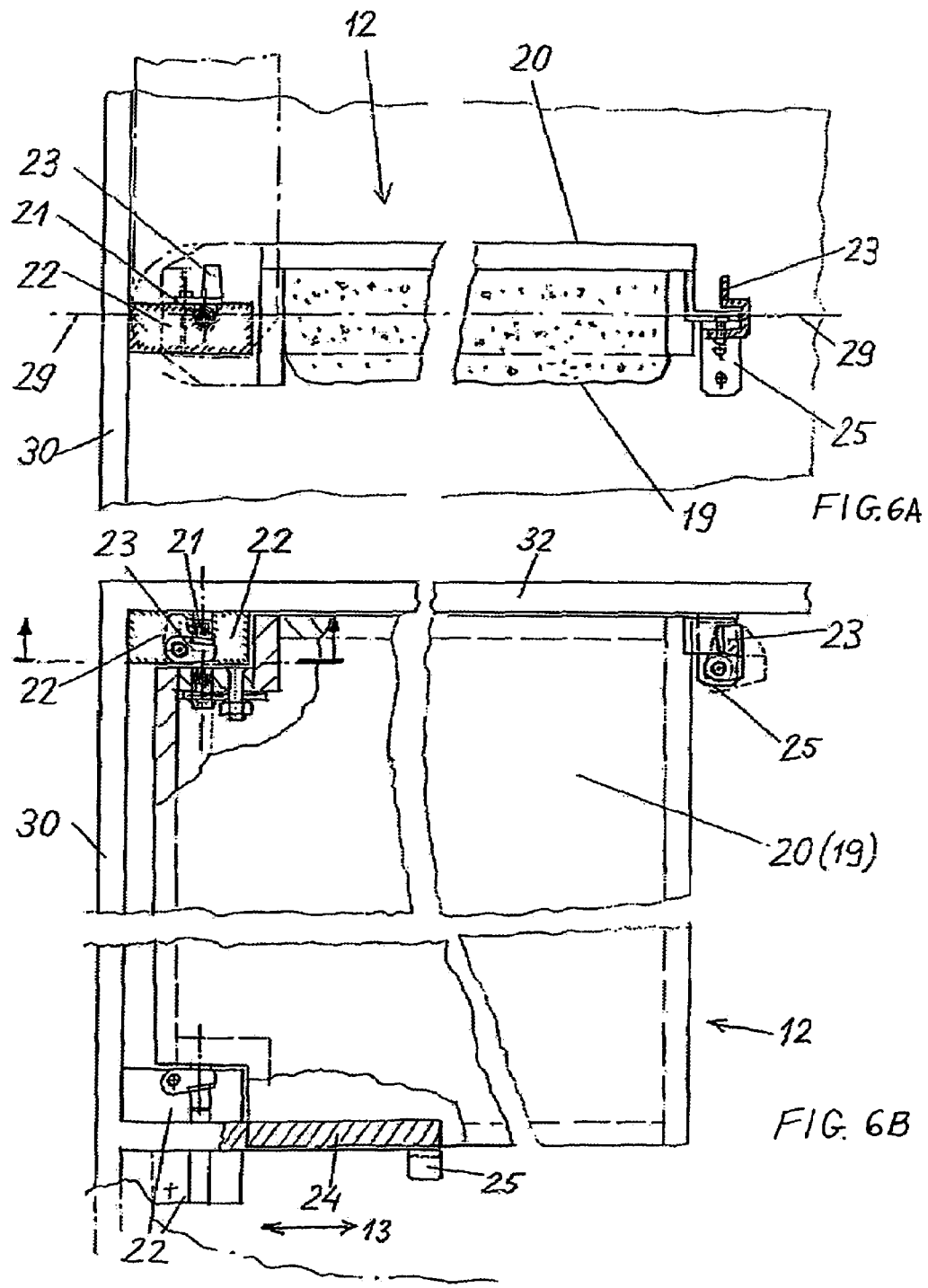
FIG. 6A is a schematic vertical sectional view through a portion of a table and/or seat element in the inventive multipurpose compartment.
FIG. 6B is a partially sectioned and partially broken-open plan view of portions of the table and/or seat element according to FIG. 6A.

In that regard, turn bolts or pivot pins 21 of the table element 12 are preferably removably engaged into corresponding slots, notches or grooves of fittings 22, with the desired surface 19 or 20 of the table element 12 oriented suitable upwardly, and the bolts or pins 21 are respectively secured in the fittings 22 with respective latches 23 (also see the detail illustration in FIGS. 6A and 6B). The other contact support points for supporting the table element 12 are provided by a middle wall 24 and a support fitting 25 mounted on the side wall 32. A simple latch 23 is also provided on the support fitting 25, just as on the fitting 22. The above mentioned turning-over of the table element 12 is easy to carry out, because the table element 12 is relatively light in weight (approximately 5 kg).

Furthermore, the seat element 13 or the foldable seat 14 can be tilted down for use in the configuration of the compartment 1 as a childcare or patient care room. For example, this is necessary if a passenger is to be medically treated or cared for while in a seated position. Moreover, if necessary or desired, the seat element 13 can be hung or supported on additional fittings 22 and 25 so that the seat element 13 lies horizontally at the same height and in the same horizontal plane as the table element 12, so that the two elements 12 and 13 form a continuous planar support surface on which a patient or other person to be cared for in the compartment 1 can lie in a horizontal position.

Still further, the compartment 1 can be outfitted with additional elements facilitating the care of infants and/or medical patients. For example, a microwave oven 26 can be installed in or under the sanitary goods cabinet 6 adjacent to the wash basin 5. This microwave oven 26 may be used, for example, for heating baby food, baby formula, or other food products. Also, the compartment 1 is illuminated by a centrally located general-illumination ceiling light, and advantageously further by a light band 27 arranged on the bottom side of the hanging cabinet 15 for directly illuminating the table element 12 in its horizontal tipped-down position.

Figure 5:
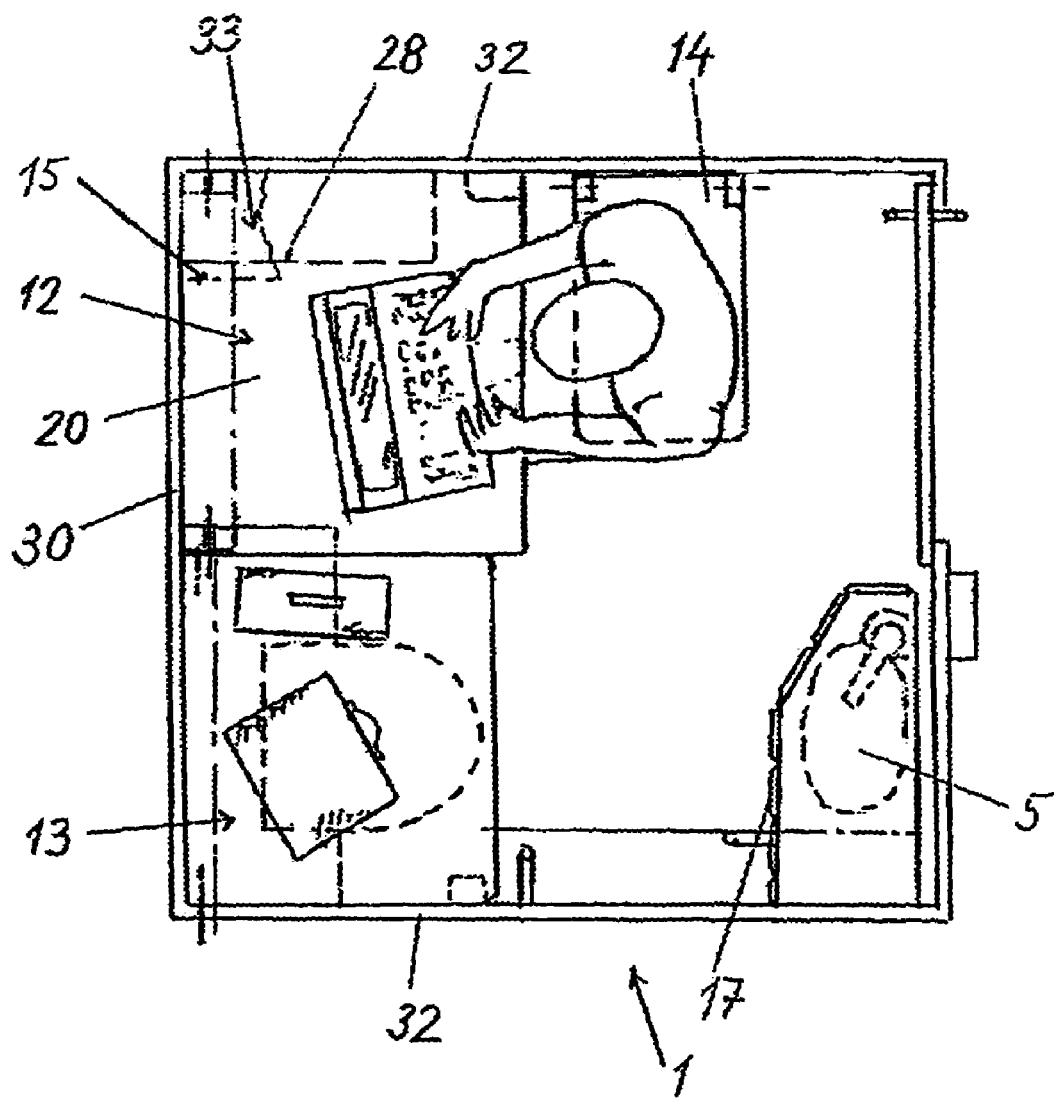
FIG. 5 is a schematic plan view of the multipurpose compartment adapted or set-up as an office or telephone compartment.

FIG. 5 illustrates a further conversion or adaptation of the multipurpose compartment 1 into a configuration as a work office. To achieve this configuration, only a few manual manipulations are necessary, e.g. tilting down the seat element 13 so as to cover and hide the toilet 4, and pulling out the extendable cover 17 over the handwash basin 5, so that the sanitary facilities of the compartment 1 are essentially hidden, and additional counter surfaces or the like are provided, on which work-related items may be placed. Furthermore, the table element 12 is tilted down and positioned with the smooth flat surface 20 thereof facing upwardly. To provide a suitable work surface, the table 12 is positioned at a height above the floor in a typical height range suitable for a desk or a work table, for example in a range from 24 to 42 inches or 610 to 1070 mm, or as a particular example 750 mm. For working at the table 12, the user of the compartment 1 can tilt down and sit on the foldable seat 14 or the seat element 13.

The space under the table element 12 is used for storing or installing an electronic data processing system 28 or computer system. Accessories, peripherals, and/or communication devices 33, such as a printer, a monitor or display, a keyboard, a telefax device, a telephone, or the like can be removed from storage positions in the hanging cabinet 15 or are mounted respectively on at least one of the walls 30, 32 and/or 34. Thus, the available accessories, peripherals, and/ or communication devices 33 are arranged in the direct range of reach of the user, either on the wall(s) 30, 32 and/or 34, on the table 12, or on the seat element 13, which may be positioned at the same height and on the same plane as the table 12 for this purpose. The light band 27 arranged on the bottom side of the hanging cabinet 15 illuminates the tilted-down table element 12 and thus the desk work surface area.

In addition or as an alternative to the use of the compartment 1 as a work office when configured in this manner, the compartment 1 can be used for further purposes, for example as a conference room with at least two seats 13 and 14, as a telephone booth, for storing special baggage (for example valuable musical instruments), or as an enclosed and contained smokers' room. For the case of using the compartment 1 as a so-called "smoker island" or enclosed and contained smokers' room, it is possible to control the air conditioning system, and particularly one or more ventilation air inlets and outlets 38 (see FIG. 2A), in such a manner so as to achieve a slight negative or lower air pressure in the closed passenger compartment 1 relative to the passenger cabin of the aircraft. Thereby, the escape of smoke and odors from the compartment 1 into the passenger cabin is avoided.

With such a flexibly adaptable multipurpose compartment 1 arranged within the aircraft passenger cabin, the airline operating the aircraft will find various possibilities to configure or set-up this compartment 1 in any particular manner suitable for the particular needs at hand, and then to provide the appropriately configured compartment 1 for the general use of the passengers, or to separately rent the compartment 1 to one or more passengers for an entire flight or for particular time slots during a flight. Alternatively, the compartment 1 can be offered as an elevated comfort feature for the passengers of higher air travel classes (e.g. first class).

FIGS. 6A and 6B show construction details of the table/ seat element 12 and the seat element 13 in sections in an elevation view and a plan view, respectively. Particularly, FIGS. 6A and 6B show the table element 12 in the deployed or tilted-down position, whereby the table element 12 is supported on the rear wall 30 and the side wall 32 with fixtures or fittings 22 and 25. This mounting and support of the table element 12 on fittings 22 and 25 also pertains just the same for the support of the seat element 13. The table and seat elements 12 and 13 each have a similar construction, with a flat, smooth, hard, easily cleanable solid surface 20 and a soft, padded, cushioned or upholstered surface 19 on opposite sides of the respective element 12 or 13.

The pivot pin or turn bolt 21 is located on the mid-plane 29 of the cross-section or thickness of the respective table or seat element 12 or 13, so that it is quite simple, without limitation or constraint of the pivoting motion of the element, to select either the flat surface 20 or the padded surface 19 as the top surface of the respective element 12 or 13 simply by turning-over the element and engaging the pivot pins 21 into the fittings. Then, simple rotatable or pivotable latches 23 are latched so as to securely hold the element 12 or 13 in the selected position. Any other configuration of a latch device could be used instead.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger transport aircraft having a passenger cabin therein, and having a passenger-use compartment that is arranged in said cabin and includes a front wall, a rear wall and at least one side wall bounding a compartment space within said compartment, an improvement wherein said compartment is a convertible multipurpose compartment equipped with functional elements, at least some of which can be selectively variably arranged to adapt and configure said compartment for use by one or more persons selectively for a selected purpose among plural available different purposes, wherein said selected purpose corresponds to a utilization of said compartment as a detention cell for securely detaining a person therein, wherein said compartment space within said compartment has dimensions in a range from those of a normal aircraft toilet compartment up to those of a handicapped accessible toilet compartment or 2.5 times those of the normal aircraft toilet compartment, wherein said functional elements include at least one seat element, a variable table/seat element, and at least one storage receptacle, that can be selectively variably arranged corresponding to the selected purpose of said compartment, wherein a seat mounting rail extends through said compartment along a floor of said passenger cabin, wherein said functional elements further include at least one securing eyelet secured to said seat mounting rail in said compartment, whereby said securing eyelet is constructed and adapted to have handcuffs or ankle shackles strongly secured thereto for securely restraining a person.

2. The improvement in the passenger transport aircraft according to claim 1, wherein said compartment space has a square or rectangular floor plan, with said dimensions being edge dimensions of said square or rectangular floor plan in a range from 1200 mm to 1600 mm.

3. The improvement in the passenger transport aircraft according to claim 1,
further comprising a toilet and a handwash basin installed in said compartment,
wherein said functional elements further include a movable basin cover that can be selectively moved into position to cover said handwash basin from above and selectively stowed to uncover said handwash basin, and
wherein said seat element is tiltably secured to one of said walls above said toilet so that said seat element is selectively tiltable between an upright stowed position in which said seat element is not obstructing use of said toilet and a horizontal seating position in which said seat element covers said toilet from above.

4. The improvement in the passenger transport aircraft according to claim 3, wherein said seat element comprises a main seat body extending along a plane, and an L-shaped rim that protrudes from a front edge of said main seat .body downwardly when said seat element is in said horizontal seating position.

5. The improvement in the passenger transport aircraft according to claim 1, wherein said table/seat element is tiltably secured to one of said walls to be selectively tiltable between an upright stowed position and a horizontal use position in which said table/seat element is arranged at a suitable height for a seated person to use said table/seat element as a desk or table work surface or for use as an elevated seat.

6. The improvement in the passenger transport aircraft according to claim 1, wherein said seat element and said table/seat element each respectively have two opposite major surfaces including one smooth solid surface and one padded surface on respective opposite sides thereof.

7. The improvement in the passenger transport aircraft according to claim 6, further comprising grooved or slotted receiver fittings, support fittings, and latches mounted on one or more of said walls, wherein said respective seat element and/or table/seat element respectively further comprises pivot pins extending along a middle plane thereof, said pivot pins are removably and pivotably supported in said grooved or slotted receiver fittings to allow said respective element to pivot and to be selectively turned-over to selectively position said smooth solid surface or said padded surface facing upwardly when said respective element is in a horizontal use position, whereby a front edge of said respective element is supported on said support fittings and said respective element can be latched in said horizontal use position with said latches.

8. The improvement in the passenger transport aircraft according to claim 1,
wherein said functional elements further include a folding seat tiltably mounted on one of said walls adjacent to said table/seat element,
wherein said storage receptacle comprises a storage cabinet that is mounted in said compartment above said table/seat element and that contains and stores at least one of electronic communication devices, computer peripheral devices and computer accessory devices,
further comprising an electronic data processing device or compute installed in a space below said table/seat element,
further comprising a handwash basin installed in said compartment,
wherein said functional elements further include a cover that can selectively be stowed away or positioned to cover said handwash basin and form with said cover a horizontal counter surface above said handwash basin, and
wherein said selected purpose further selectively corresponds to a utilization of said compartment as a work office.

9. The improvement in the passenger transport aircraft according to claim 1, wherein said walls are noise-proof walls.

10. The improvement in the passenger transport aircraft according to claim 1, wherein said functional elements further include a selectively activatable monitoring arrangement including a camera and a microphone arranges in said compartment.

11. The improvement in the passenger transport aircraft according to claim 1, wherein said seat element and said table/seat element are both configured and arranged so that said seat element and said table/seat element can both be selectively arranged at a common height to extend horizontally on the same single horizontal plane and said seat element can be selectively arranged at a different height lower than said common height, and further comprising fittings secured to said walls and supporting said seat element selectively at said common height and at said different height, and wherein said selected purpose further selectively corresponds to a utilization of said compartment as a childcare or medical care compartment.

12. The improvement in the passenger transport aircraft according to claim 1, wherein one of said walls has an entryway therein, and further comprising an indicator element mounted outside of said compartment adjacent to said entryway, wherein said indicator element visually displays a pertinent information selected from plural available informations dependent on and responsive to said selected purpose and an existing utilization of said compartment.

13. The improvement in the passenger transport aircraft according to claim 1, wherein one of said walls has an entryway therein, and further comprising a slidable or pivotable rigid door selectively opening and closing said entryway, wherein said door is manually operable or automatically operable by pressing a door actuating button, and further comprising a door lock device that is activatable by a key or by a numeric code entered on a keypad.

14. The improvement in the passenger transport aircraft according to claim 1, further comprising air vents that are arranged in said compartment and that are controlled so as to create a slight negative air pressure in said compartment space within said compartment relative to said passenger cabin outside of said compartment.

15. In a passenger transport aircraft having a passenger cabin therein, having a wastewater system and a water supply system, and having a passenger-use compartment that is arranged in said cabin and that includes a front wall, a rear wall and at least one side wall bounding a compartment space within said compartment, as well as a toilet and a handwash basin arranged in said compartment space and connected to said wastewater system and said water supply system of said aircraft,
an improvement wherein said compartment is a convertible multipurpose compartment that is adapted to be selectively used as a detention cell for securely detaining a person therein, further comprising:

a first seat that is tiltably mounted on a first one of said walls above said toilet, so that said first seat can be selectively tilted up into a stowage position in which said first seat does not obstruct use of said toilet and tilted down into a use position in which said first seat covers said toilet from above and in which a person can sit on said first seat, a table that is tiltably mounted on any one of said walls so that said table can be selectively tilted up into a stowage position along said any one of said walls and tilted down into a use position in which said table has an upper surface thereof oriented horizontally at a table height in a height range from 61 to 107 cm above a floor of said compartment, a cover that is movable so that said cover can be selectively stowed in a stowage position without covering or obstructing said handwash basin and selectively moved to a use position in which said cover covers said handwash basin from above, a seat mounting rail that extends through said compartment alone a floor of said passenger cabin, and a securing eyelet that is secured to said seat mounting rail in said compartment and that is constructed and adapted to have handcuffs or ankle shackles strongly secured thereto for securely restraining a person.

16. The improvement in the passenger transport aircraft according to claim 15, further comprising a second seat that is tiltably mounted on a second one of said walls other than said first one of said walls, so that said second seat can be selectively tilted up into a stowage position along said second one of said walls and tilted down into a use position in which a person can sit on said second seat.

17. The improvement in the passenger transport aircraft according to claim 16, wherein said first and second walls meet one another and form a corner, and said table is arranged at said corner, with said first and second seats respectively adjacent to first and second free edge of said table opposite said second and first walls respectively.

18. The improvement in the passenger transport aircraft according to claim 15, wherein said table has a smooth hard solid surface and a soft padded surface respectively on opposite major sides thereof, and can be selectively oriented with either said solid surface or said padded surface facing upwardly in said use position of said table.

19. The improvement in the passenger transport aircraft according to claim 15, wherein said first seat can further be selectively positioned in an elevated position higher than said use position thereof, and wherein said first seat in said elevated position extends horizontally at said table height on a common horizontal plane together with and adjacent to said table in said use position of said table.

20. The improvement in the passenger transport aircraft according to claim 19, wherein said first seat has a smooth hard solid surface and a soft padded surface respectively on opposite major sides thereof, and can be selectively oriented with either said solid surface or said padded surface facing upwardly in said elevated position of said first seat.

21. The improvement in the passenger transport aircraft according to claim 1, wherein said walls extend from a floor to a ceiling bounding said compartment space, so that said floor, said ceiling and said walls enclose said compartment space.

22. The improvement in the passenger transport aircraft according to claim 15, wherein said walls extend from a floor to a ceiling bounding said compartment space, so that said floor, said ceiling and said walls enclose said compartment space.

* * * * *

UNITED STATES PATENT AND TRADEMARK OFFICE
CERTIFICATE OF CORRECTION

PATENT NO. : 7,364,119 B2
APPLICATION NO. : 10/929092
DATED : April 29, 2008
INVENTOR(S) : Sprenger et al.

Page 1 of 1

It is certified that error appears in the above-identified patent and that said Letters Patent is hereby corrected as shown below:

Title page,
Item [*], Notice,
Line 3, after "by", replace "220" by --190--;

Column 9,
Line 26, after "main", replace "seat .body" by --seat body--;

Column 10,
Line 2, before "installed", replace "compute" by --computer--;
Line 20, after "microphone", replace "arranges" by --arranged--;

Column 11,
Line 23, after "ment", replace "alone" by --along--;

Column 12,
Line 3, after "free", replace "edge" by --edges--.

Signed and Sealed this

Sixth Day of October, 2009

David J. Kappos
*Director of the United States Patent and Trademark Office*